United States Patent [19]

Mahulikar et al.

[11] Patent Number: 4,578,320

[45] Date of Patent: Mar. 25, 1986

[54] COPPER-NICKEL ALLOYS FOR BRAZED ARTICLES

[75] Inventors: Deepak Mahulikar, West Haven; Eugene Shapiro, Hamden, both of Conn.

[73] Assignee: Olin Corporation, New Haven, Conn.

[21] Appl. No.: 587,750

[22] Filed: Mar. 9, 1984

[51] Int. Cl.$^4$ .............................................. B32B 15/20
[52] U.S. Cl. .................... 428/674; 148/414; 148/435; 228/263.18; 420/487
[58] Field of Search .................. 148/11.5 C, 12.7 C, 148/414, 435; 428/674; 420/485, 487, 493, 499; 228/263.18

[56] References Cited

U.S. PATENT DOCUMENTS

| | | | |
|---|---|---|---|
| 1,525,047 | 2/1925 | Rath | 420/487 |
| 2,074,604 | 3/1937 | Bolton et al. | 420/487 |
| 2,144,279 | 1/1939 | Whitman | 420/471 |
| 2,215,905 | 9/1940 | Kihlgren | 420/487 |
| 3,728,106 | 4/1973 | Badia et al. | 148/435 |
| 4,169,729 | 10/1979 | Popplewell et al. | 420/471 |

FOREIGN PATENT DOCUMENTS

| | | | |
|---|---|---|---|
| 2311400 | 12/1974 | Fed. Rep. of Germany | 420/485 |
| 116846 | 9/1981 | Japan | 420/487 |
| 43950 | 3/1982 | Japan | 420/487 |

OTHER PUBLICATIONS

Mendenhall, *Understanding Copper Alloys*, Olin Brass, East Alton, Illinois, 1977, pp. 206 & 208 & 209.

*Primary Examiner*—Wayland Stallard
*Attorney, Agent, or Firm*—Barry L. Kelmachter; Howard M. Cohn; Paul Weinstein

[57] ABSTRACT

The present invention relates to copper-nickel alloys having improved ductility at elevated temperatures. The alloys consist essentially of about 5% to about 45%, preferably about 5% to 35% nickel, about 0.4% to about 1.1%, preferably about 0.6% to about 1% manganese, about 0.003% to about 0.04%, preferably about 0.008% to about 0.03% phosphorous and the balance essentially copper. The alloys described herein have particular utility in brazed articles or assemblies.

15 Claims, No Drawings

COPPER-NICKEL ALLOYS FOR BRAZED ARTICLES

The present invention relates to copper base alloys and more particularly copper-nickel alloys having improved ductility at elevated temperatures.

It is well known that copper-nickel alloys are particularly well adapted for use in those environments where resistance to corrosion and mechanical strength are required. Applications for these alloys include tubing for heat exchangers such as radiators and oil coolers, salt water lines such as fire lines and sanitary lines, sheathing for lifeboats, fuel lines and pressure-containing parts in valves and fittings which are used at elevated temperatures. Often during fabrication into a final product, the alloys are subjected to elevated temperatures such as those associated with brazing. One particular family of copper-nickel alloys that have been used in a variety of applications because of their ductility and ability to withstand high temperatures are cooper-nickel-manganese alloys. U.S. Pat. Nos. 1,525,047 to Rath, 2,074,604 to Bolton et al., 2,144,279 to Whitman, 2,215,905 to Kihlgren and 4,169,729 to Popplewell et al. illustrate several copper-nickel-manganese alloys and their applications.

Where copper-nickel alloys are used as part of a brazed assembly, it is not uncommon for cracks to be observed in the copper-nickel alloy material. The cracks are believed to be caused by the stresses that develop during cooling from the brazing temperature. More particularly, the cracking problem is believed to be due to the intermediate temperature ductility minimum which exists in the 565° C. to 730° C. temperature range. The hot tensile ductility in this temperature range can be as low as 1%. In addition, pronounced grain growth as a result of the temperatures during brazing approaching the melting point of the alloy is a problem. Where grain size is too large, the brazed articles have very low strength.

It is an object of the present invention to provide a cooper-nickel alloy system having improved ductility at elevated temperatures.

It is a further object of the present invention to provide a copper-nickel alloy system as above which does not experience extreme grain coarsening at elevated temperatures.

It is a further object of the present invention to provide a copper-nickel alloy system as above which has particular utility in brazed assemblies.

Further objects and advantages of the present invention will become apparent from a consideration of the following specification.

The alloy system of the present invention fulfills these objects and advantages by utilizing alloying additions of nickel, manganese and phosphorous in a copper base. Alloys in accordance with the present invention consist essentially of from about 5% to about 45% nickel, from about 0.4% to about 1.1% manganese, from about 0.003% to about 0.04% phosphorous and the balance essentially copper. As used herein, the percentages for each addition are weight percentages. The higher nickel contents are generally used where strength and/or more aggressive environments are encountered in service.

In a preferred embodiment, the alloy system of the present invention consists essentially of from about 5% to about 35% nickel, from about 0.6% to about 1% manganese, from about 0.008% to about 0.03% phosphorous and the balance essentially copper.

The alloys of the present invention have particular utility in brazed assemblies or assemblies subjected to high tempreature processes and techniques. For example, tubing used in heat exchangers such as radiators and oil coolers may be fabricated from the alloys of the present invention. The alloys of the present invention may be used for such assemblies because of their improved ductility, relatively fine grain structure, and relatively high strength at elevated temperatures properties. In addition, alloys in accordance with the present invention exhibit good brazing properties.

As previously discussed, the copper-base alloys of the present invention consist essentially of from about 5% to about 45% nickel, from about 0.4% to about 1.1% manganese, from about 0.003% to about 0.04% phosphorous and the balance essentially copper. In a preferred embodiment, the copper-base alloys consist essentially of from about 5% to about 35% nickel, from about 0.6% to about 1% manganese, from about 0.008% to about 0.03% phosphorous and the balance essentially copper. Conventional brass mill impurities may be tolerated in the alloys of the present invention but should preferably be kept at a minimum.

Ordinarily, copper nickel alloys that are exposed to high temperatures such as those associated with brazing experience grain coarsening. This grain coarsening adversely impacts the material and reduces the overall strength of the material. It has been found that manganese and phosphorous additions within the limits described herein provide the copper-nickel alloys of the present invention with relatively fine grain structures that improve the strength characteristics of the alloys particularly at elevated temperatures. In particular, the alloys of the present invention have improved ductility at elevated temperatures which permit greater elongation percentages at the elevated temperatures. As a result, cracking in assemblies subjected to heat treatments such as in brazed assemblies is significantly reduced.

It is believed that the manganese addition affects the brazing and mechanical properties of the alloy system while the phosphorous addition controls grain growth during processing at elevated temperatures e.g., brazing. More particularly, the manganese addition is believed to tie up any sulfur impurity before it can go to the grain boundary and adversely affect the properties of the alloy. The phosphorous addition is believed to go to the grain boundary and substantially prevent the grains from growing. The higher nickel contents associated with the alloys of the present invention are typically used where strength and/or aggressive environments are encountered in service.

The alloys of the present invention may be cast in any desired manner. For example, they may be cast using continuous casting, direct chill casting or Durville casting. Any suitable pouring temperature may be used during casting. Generally, the pouring temperature will preferably be in the range of about 1000° C. to about 1300° C. Most preferably, the pouring temperature is in the range of about 1050° C. to about 1150° C.

After casting, the alloys of the present invention may be processed in any desired manner. Preferably, the alloys will be processed by breaking down the cast ingot into a strip material such as a sheet or plate using a hot working operation such as hot rolling followed by a cold working operation such as cold rolling. During cold rolling, the alloy may be subjected to one or more passes through a rolling mill until it reaches final gage. If necessary, one or more interanneals may be performed during the cold rolling operation. Furthermore, the final strip material may have any desired temper and may be further annealed to provide that temper. The various hot rolling, cold rolling and/or annealing steps may be performed using any conventional technique and apparatus known in the art.

The hot rolling step may be performed with any suitable initial temperature. Perferably, the initial hot rolling temperature is in the range of about 700° C. to about 1050° C. Most preferably, the initial hot rolling temperature is in the range of about 780° C. to about 1000° C. Any suitable cooling rate may be used to cool the strip material from hot rolling.

The alloys of the present invention are believed to be capable of cold rolling reductions in excess of 90%; however, the cold rolling reduction will preferably be between 10% and 80%. The cold rolling operation may be performed in one or more rolling passes.

Preferably, annealing temperatures in the range of about 550° C. to about 900° C. for at least one minute to about 24 hours are used for the interanneals and/or the final anneal to a desired temper.

After the processing has been completed, the strip material may be fabricated into any desired article. As previously stated, the alloys of the present invention readily lend themselves for use in brazed assemblies such as tubing. When use in such assemblies, the alloys of the present invention demonstrate excellent brazing characteristics and may be used with any suitable filler material. For example, they may be used with filler materials such as copper alloys C11000 and C12200. Of course, the temperatures used in brazing depend upon the filler material being used. For copper alloys such as C11000 and C12200, the brazing temperature is typically in the range of about 1065° C. to about 1120° C., generally about 1090° C. It has been found that when subjected to a brazing temperature of about 1090° C., the alloys of the present invention preferably exhibit a grain size of less than about 0.5 mm, generally about 0.2 mm. It is believed that the relatively fine grain structures of the present alloys provide them with improved ductility and strength properties. It should be noted that the improved ductility at elevated temperatures associated with the present alloys facilitate fabrication operations in general.

The present invention and improvements resulting therefrom will be more readily apparent from a consideration of the following illustrative examples.

EXAMPLE I

A series of alloys were prepared having the nominal compositions set forth in Table I below.

TABLE I

| Alloy | Ni (%) | Mn (%) | P (%) | Cu (%) |
| --- | --- | --- | --- | --- |
| A | 20 | 0.3 | 0.002 | bal |
| B | 20 | 0.27 | 0.008 | bal |
| C | 21 | 0.6 | <0.0025 | bal |
| D | 21 | 0.75 | — | bal |
| E | 21 | 1.0 | — | bal |
| F | 21 | 0.6 | 0.008 | bal |
| G | 21 | 0.75 | 0.015 | bal |
| H | 21 | 1.2 | 0.008 | bal |
| I | 21 | 1.5 | 0.015 | bal |

The alloys were Durville cast and were processed in the following manner. The alloys were soaked at 980° C. for 40 minutes and then hot rolled to 0.4". The plates were then milled and cold rolled down to 0.020" gage. At this gage, the plates were annealed at 700° C. for 1 hour to a soft temper.

EXAMPLE II

To determine the ductility of Alloy A, 8" long×0.5'-'wide×0.018" thick samples of Alloy A were placed in a standard tensile testing apparatus. A first sample was heated to a temperature of 580° C., held at this temperature for 10 minutes and subjected to an applied tensile load until it fractured. The crosshead of the testing apparatus was moved at a speed of 0.003"/minute to apply the tensile load. A seond sample of Alloy A was heated to 725° C., held at this temperature for 10 minutes and subjected to a tensile load unit it fractured. Alloy A showed an elongation of 1% at 580° C. and 2% at 725° C.

Samples of Alloy A were also brazed to steel plates using a standard brazing technique. Brazing was performed at 1090° C. using either copper alloy C11000 or copper alloy C12200 as a filler material. After brazing, the samples were analyzed for cracks and for grain size. The brazed samples showed evidence of cracking during the brazing cycle. In addition, the samples showed a grain size greater than 2 mm. after brazing.

EXAMPLE III

As in Example II, a series of hot tensile tests were conducted on samples of Alloys C, D and E. These samples all contain fom 0.6% to 1.0% manganese. The tests were conducted at the same temperatures and in the same manner as the tests described in Example II. The results of these tests are described in Table II along with the elongation results of Example II. As can be seen from this table, elongation at 580° C. ranged from 1.5% to 3.5% and at 725° C. ranged from 1.5% to 6.5% for these alloys.

TABLE II

| Alloy | Temperature (°C.) | Elongation % |
| --- | --- | --- |
| A | 725 | 2 |
| A | 580 | 1 |
| C | 725 | 1.5 |
| C | 580 | 3 |
| D | 725 | 4 |
| D | 580 | 1.5 |
| E | 725 | 6.5 |
| E | 580 | 3.5 |

Samples of alloys C, D, and E were also subjected to the same brazing test as described in Example II. The samples showed a grain size greater than 2 mm. after brazing at 1090° C.

EXAMPLE IV

Samples of Alloys B, F, G, H and I were subjected to a series of hot tensile tests. These alloys contain manganese between 0.3% and 1.5% and phosphorous between 0.002% and 0.0015%. The tensile tests were performed as described hereinabove. The results of these tests are given in Table III below. For comparision purposes, the elongation test results of Example II are also included in Table III.

As can be seen from Table III, elongation was in the 1-2% range when the manganese and phosphorous contents were low (Alloy A). Increasing only the phosphorous level (Alloy B) provided a small increase in ductility to increase the elongation to the 4–4.5% range.

However, increasing both the manganese and phosphorous contents (Alloys F, G, H and I) increased ductility so that elongation values greater than 9% were obtained.

TABLE III

| Alloy | Temperature (°C.) | Elongation % |
|---|---|---|
| A | 725 | 2 |
| A | 580 | 1 |
| B | 725 | 4 |
| B | 580 | 4.5 |
| F | 725 | 9 |
| F | 580 | 5.5 |
| G | 725 | >9 |
| G | 580 | >8 |
| H | 725 | >9 |
| H | 580 | 5.5 |
| I | 725 | 9.0 |
| I | 580 | 7.5 |

In addition, all ingots containing more than 0.002% phosphorous (Alloys B, F, G, H and I) showed a grain size of about 0.2 mm. Alloys having such a relatively fine grain structure should provide a brazed article with improved strength properties.

EXAMPLE V

Samples of Alloys A, E, G and H were evaluated in brazing tests. Two tests were employed: one which measured the ability to wet; and the second which measured porosity in the brazed point. The first test consisted of joining two plates of the alloy being tested together in a T-shape configuration. The plates were joined using either copper alloy C11000 or copper alloy C12200 as a filler material. The plates were then placed in a furnace and brazed at a temperature of 1090° C. The ability to wet was measured by measuring the height to which the filler material climbed on the plates. Thereafter, specimens of the brazed joint were placed under a microscope and the porosity was evaluated. The results of these tests are reported in Table IV.

TABLE IV

| Alloy | Filler | Wetting Ability* | % Porosity in Filler |
|---|---|---|---|
| A | C12200 | A | 15 |
| A | C11000 | A | 24 |
| E | C12200 | A | 1.2 |
| G | C12200 | A | 5 |
| G | C11000 | A-B | 12.25 |
| H | C12200 | A-B | 11.7 |
| H | C11000 | C | 27 |

*A - Very Good
B - Fair to Good
C - Poor

As can be seen from Table IV, Alloy H containing more than 1.1% manganese was unacceptable from a brazing standpoint. The most acceptable alloys from a brazing standpoint were Alloys E and G having a manganese content of 0.75% to 1%. While demonstrating good wetting ability, Alloy A having a manganese content of 0.3% had relatively poor porosity results.

It is believed that these examples demonstrate the benefits e.g., improved ductility at elevated temperatures, relatively fine grain structures, and improved brazing ability, which can be obtained using copper-nickel alloys having manganese and phosphorous additions within the aforementioned critical ranges. The alloys of the present invention readily lend themselves to applications, such as tubing for heat exchangers, where such excellent ductility, strength and brazing properties are required.

While the nickel content of the alloys of the present invention has been described as being from about 5% to about 45%, the nickel content may be as great as about 65% without adversely affecting the desirable properties of the alloys.

The U.S. patents set forth in this application are intended to be incorporated by reference herein.

It is apparent that there has been provided in accordance with this invention improved copper-nickel alloys for brazed articles which fully satisfy the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A copper alloy having improved ductility at elevated temperatures, said alloy consisting of about 5% to about 45% nickel, about 0.4% to about 1.1% manganese, about 0.003% to about 0.04% phosphorous and the balance essentially copper.

2. An alloy according to claim 1 wherein said manganese is about 0.6% to about 1% and said phosphorous is about 0.008% to about 0.03%.

3. An alloy according to claim 2 wherein said nickel is about 5% to about 35%.

4. The alloy of claim 1 forming at least part of a brazed article.

5. The alloy of claim 1 having a grain size less than about 0.5 mm when heated to a temperature in the range of about 1065° C. to about 1125° C.

6. The alloy of claim 5 having a grain size less than about 0.2 mm when heated to said temperature range.

7. A brazing process comprising:
providing an article formed from a copper base alloy consisting of about 5% to about 45% nickel, about 0.4% to about 1.1% manganese, about 0.003% to about 0.04% phosphorous and the balance essentially copper;
applying a filler material to said article; and
heating said article and said filler material to a temperature sufficient to melt said filler material.

8. The brazing process of claim 7 further comprising:
the elements in said alloy consisting of about 5% to about 35% nickel, about 0.6% to about 1% manganese, about 0.008% to about 0.03% phosphorous and the balance essentially copper.

9. The brazing process of claim 7 further comprising said article being formed by:
casting said copper base alloy into an ingot; and
forming said ingot into a strip material, said forming step including cold working said strip material to a desired final gage.

10. The process of claim 9 further comprising:
annealing said strip material at a temperature in the range of about 550° C. to about 900° C. for at least about one minute to about 24 hours to provide said strip material with a desired temper.

11. The process of claim 9 further comprising:
hot working said ingot prior to said cold working step.

12. The process of claim 11 wherein said hot working step comprises:
   rolling said ingot at an initial temperature in the range of about 700° C. to about 1050° C.

13. The process of claim 12 wherein said cold working step comprises:
   rolling said strip material so as to cause a reduction between about 10% and about 80% in strip material thickness.

14. The process of claim 7 further comprising:
   providing a second metal or metal alloy article;
   applying said filler material to said second article; and
   heating said articles to join them together.

15. The process of claim 7 wherein:
   said filler material comprises a copper containing material; and
   said heating step comprises heating said article to a temperature in the range of about 1065° C. to about 1125° C.

* * * * *